Oct. 28, 1924.  
W. S. HARLEY  
1,513,170  
COOLING MEANS FOR INTERNAL COMBUSTION ENGINES  
Original Filed Nov. 1, 1919   4 Sheets-Sheet 1

Inventor  
William S. Harley  
By Edwin B. H. Tower Jr  
Atty.

Oct. 28, 1924.
W. S. HARLEY
1,513,170

COOLING MEANS FOR INTERNAL COMBUSTION ENGINES

Original Filed Nov. 1, 1919    4 Sheets-Sheet 3

Inventor,
William S. Harley
By Edwin B. H. Tower Jr.
Atty.

Oct. 28, 1924.
W. S. HARLEY
1,513,170
COOLING MEANS FOR INTERNAL COMBUSTION ENGINES
Original Filed Nov. 1, 1919    4 Sheets-Sheet 4
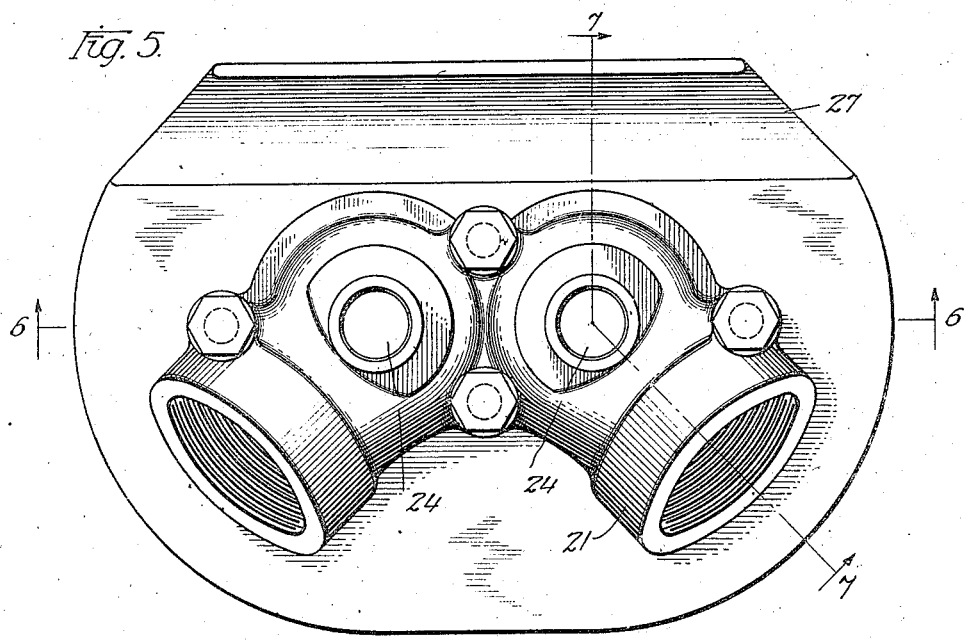
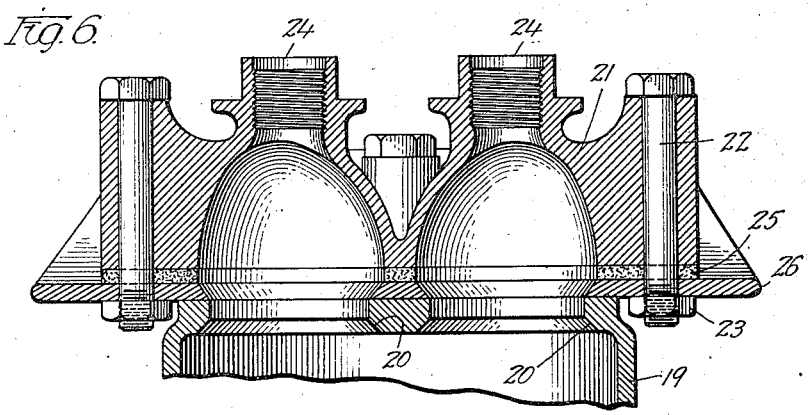
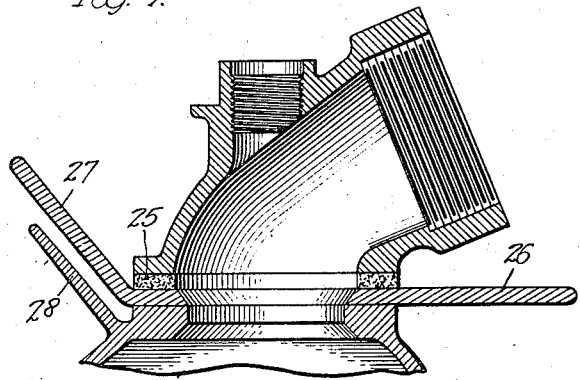
Inventor
William S. Harley
By Edwin B. H. Tower Jr
Atty.

Patented Oct. 28, 1924.

1,513,170

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

COOLING MEANS FOR INTERNAL-COMBUSTION ENGINES.

Application filed November 1, 1919, Serial No. 335,002. Renewed March 27, 1924.

*To all whom it may concern:*

Be it known that I, WILLIAM S. HARLEY, a citizen of the United States, residing at Milwaukee, in the county of Milwaukee and State of Wisconsin, have invented new and useful Improvements in Cooling Means for Internal-Combustion Engines, of which the following is a specification.

This invention relates to cooling means for internal combustion engines.

In internal combustion engines great difficulty has been experienced in preventing excessive heating of the exhaust valve, exhaust valve spindle, and exhaust valve seat, as the highly heated exhaust gases are, for a large portion of the time, passing over the valve and valve seat and around the valve spindle. The heating of the exhaust valve and seat are further increased by the transfer thereto, of heat from the exhaust valve cage or housing. It is, therefore, difficult in high powered motors to prevent preignition; the heating of the exhaust valve and port practically limiting the allowable compression. These difficulties are very pronounced in air cooled motors.

This invention is directed to means for overcoming these difficulties.

One of the objects of this invention is to provide cooling means for the exhaust valve.

A further object is to provide cooling means for the exhaust valve seat.

A further object is to provide means for preventing preignition in an internal combustion engine.

A further object is to provide means for allowing a relatively high compression without danger of preignition in an air cooled internal combustion engine.

A further object is to provide means for preventing the transfer of heat from the exhaust valve cage or housing to the exhaust valve or exhaust valve seat.

A further object is to provide an air cooled internal combustion engine of greater power for a given size than has heretofore been possible.

A further object is to provide means, for cooling the exhaust valve and the valve cage or housing of internal combustion engines, which may be readily applied to existing types of engines with only a relative slight change.

Other objects will appear.

The invention contemplates heat radiating and heat insulating means interposed between the valve seat and exhaust chamber housing of an internal combustion engine cylinder.

The views of the drawings are as follows:

Fig. 5 shows the exhaust valve cage or housing and radiating fin of a different type of engine.

Fig. 6 is a section on line 6—6 of Fig. 5.

Fig. 7 is a section on line 7—7 of Fig. 5.

Figs. 1 and 2 show the cylinder of an internal combustion engine with all valves omitted in Fig. 1 and with only the exhaust valve shown in Fig. 2.

Figure 1:
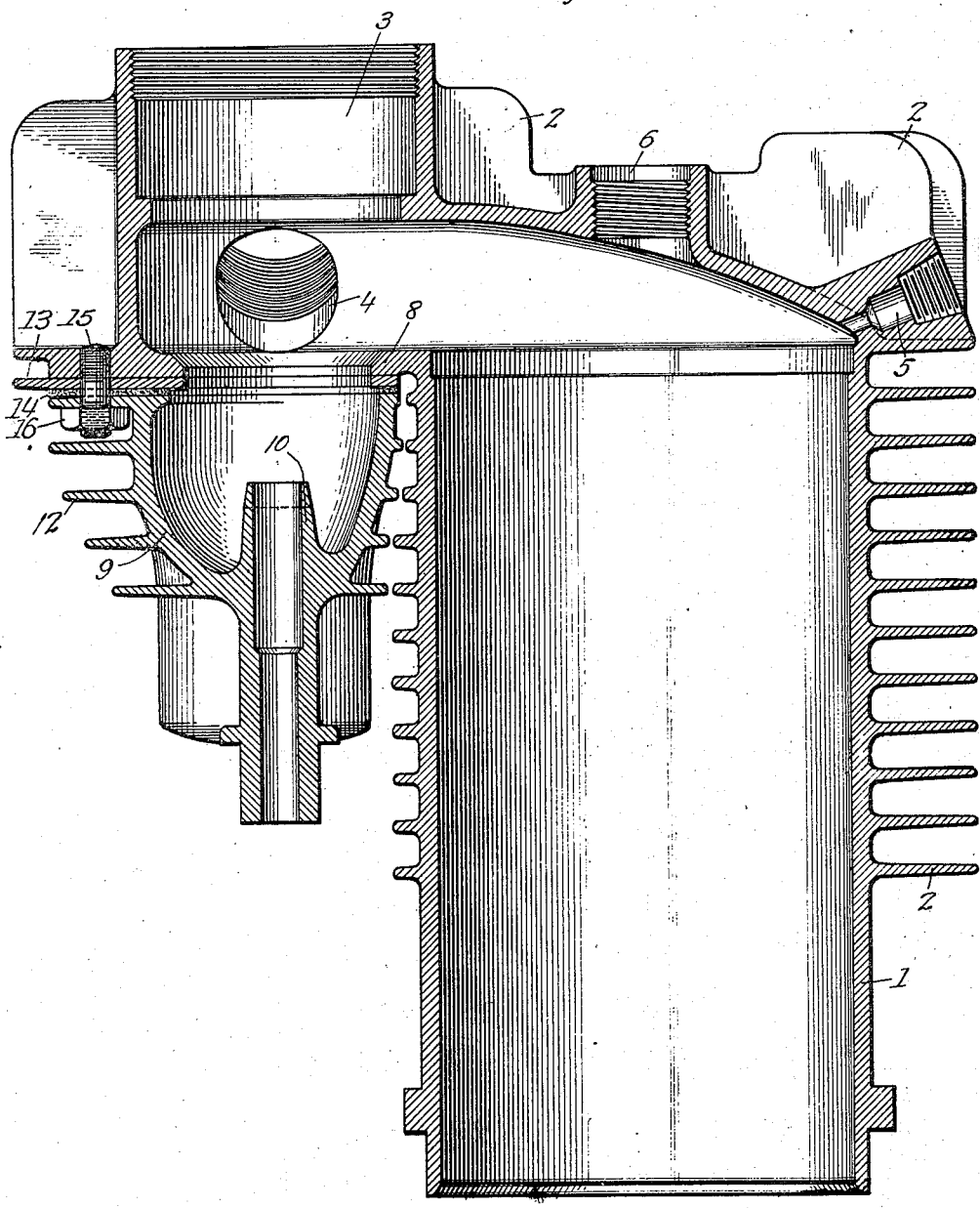
Fig. 1 is a vertical section through the cylinder of an internal combustion engine.
Figure 2:
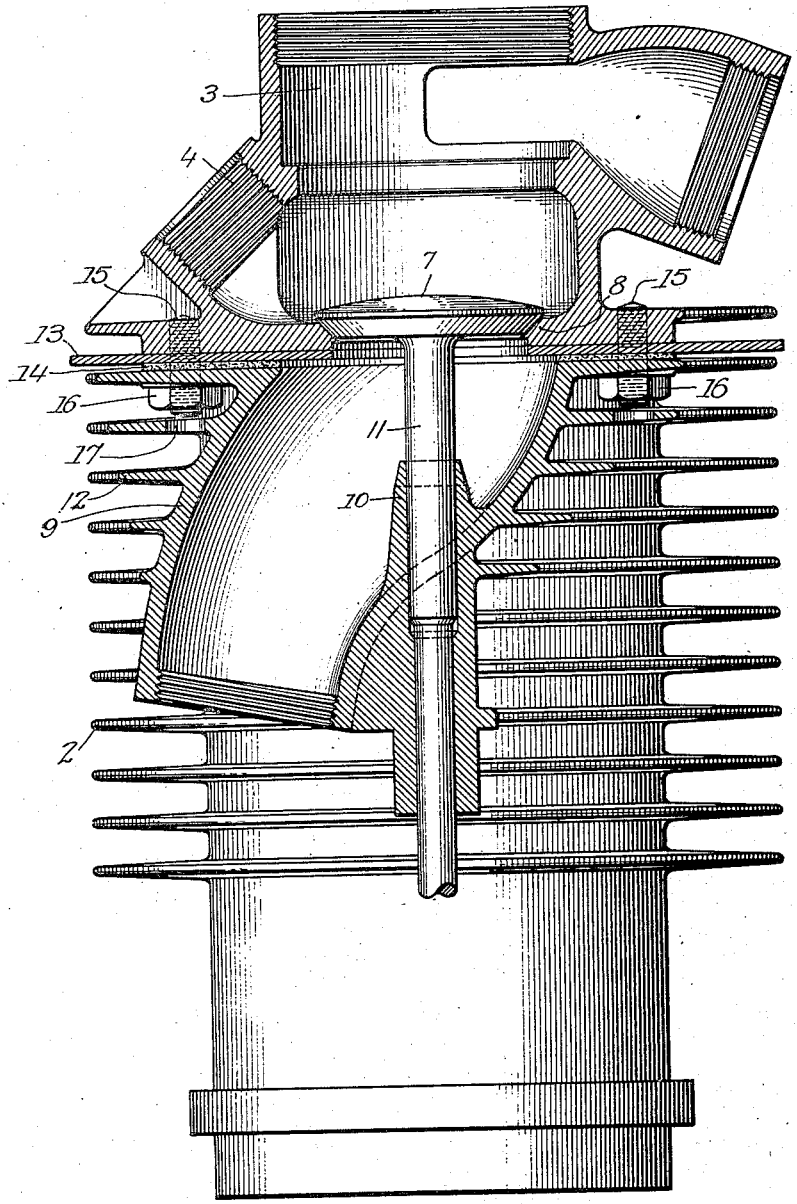
Fig. 2 is a vertical section at right angles to that of Fig. 1, and shows the exhaust valve in position.

The cylinder 1 is for an air cooled internal combustion engine, and is provided with radiating fins 2 around the cylindrical portion and across the end. The inlet valve and seat are screwed into the opening 3, the spark plug into the opening 4, the primer into the opening 5, and the support for a portion of the valve operating mechanism into the opening 6.

The exhaust valve 7 is opposite the inlet valve, in this type of engine, and its seat 8 is formed integral with the cylinder body. The exhaust valve cage or housing 9 is separate from the cylinder and has a guide 10 for the stem 11 of the exhaust valve 7. The exhaust valve cage 9 is provided with radiating fins 12.

Between the valve cage 9 and the valve seat 8 a radiating fin 13, of high thermal conductivity, and a heat insulating gasket 14 are positioned, with the fin in contact with the valve seat and the gasket between the fin and the valve cage. The valve cage, fin and gasket are tightly clamped in position by means of bolts 15, threaded into the cylinder body, and cooperating nuts 16. To facilitate assembly, openings 17 may be provided in the fins 2, which openings are adapted to accommodate the bolts.

Figure 3:
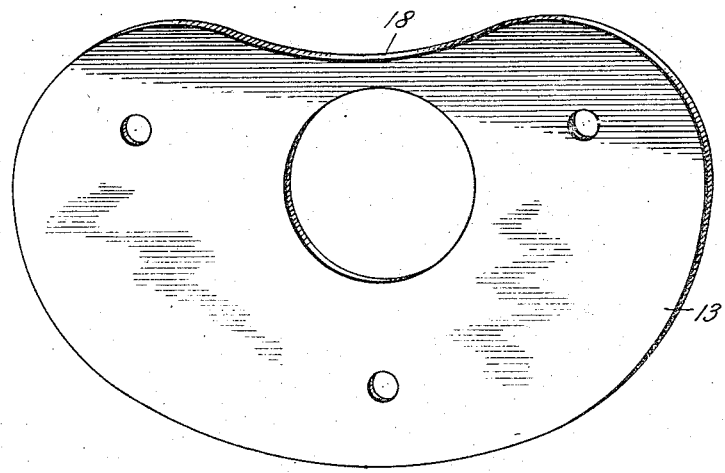
Figs. 3 and 4 show respectively the radiating fin and heat insulating gasket employed in the construction shown in Fig. 1.
Figure 4:
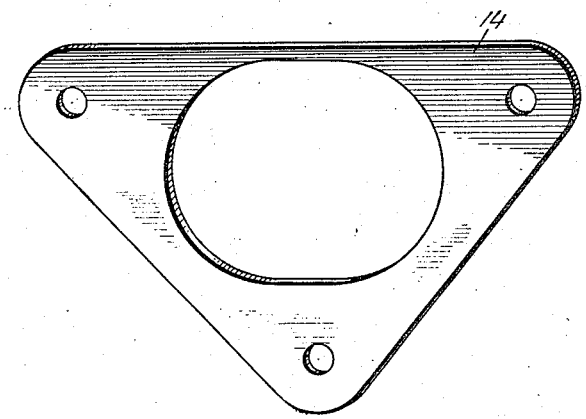

Figs. 3 and 4 are views, respectively, of the radiating fin 13 and the heat insulating gasket 14. The radiating fin 13 has one side 18 slightly recessed to permit its being positioned close to the cylinder, the recessed portion allowing room for the cylinder. The fin is formed of aluminum, copper or other metal of high thermal conductivity, and has sufficient area to make it an effective heat radiating means. The gasket 14, which may be of triangular shape as shown, is composed of asbestos, or of some other material which is a good heat insulator.

Figs. 5, 6 and 7 show a radiating fin and insulating gasket applied to an internal combustion engine having two exhaust valves and a double exhaust port, the valves being omitted for clearness.

The engine cylinder 19 has radiating fins, as in the form previously described, and has a pair of exhaust valve seats 20 formed in its end portion. The double valve cage 21 is separate from the cylinder and is secured thereto by bolts 22 and nuts 23. The valve cage 21 is provided with openings 24 into which are screwed the bushings for the valve spindles.

The gasket 25 and radiating fin 26 are positioned between the valve seats and the exhaust valve cages, the radiating fin 26 and insulating gasket being in contact, respectively, with the valve seats and double valve cage. The radiating fin 26 is bent outwardly at 27 so as not to interfere with the angularly positioned radiating fin 28 which is formed integral with the cylinder 19.

The radiating fin rapidly conducts the heat away from the valve seat and thereby lowers its temperature, so that heat will be drawn from the valve and from the portion of the valve spindle adjacent the valve.

The insulating gasket keeps the heat from flowing from the valve cage to the valve seat and thereby permits the radiating fin to freely radiate heat drawn from the valve seat and adjacent parts, without allowing it to become overloaded with heat from other sources.

The radiating fin and gasket may be readily applied to existing types of internal combustion engines with very little alteration of the engine and without necessitating a complete reorganization of the engine.

Obviously other structures may be devised which will embody the invention herein set forth.

I claim:

1. The combination of a cylinder, an exhaust valve seat, a valve cage, and means for cooling said valve seat and insulating said valve seat from said valve cage.

2. An internal combustion engine comprising a cylinder, an exhaust valve cage secured thereto, and a heat insulating gasket interposed between said cylinder and valve cage.

3. An internal combustion engine comprising a cylinder, an exhaust valve cage secured thereto, and a radiating fin of high thermal conductivity interposed between said cylinder and exhaust cage.

4. In an internal combustion engine, the combination of a cylinder and a thermally isolated exhaust valve cage.

5. In an engine having an exhaust valve, the combination of means for thermally insulating said valve from a portion of the engine structure and means for cooling said valve.

6. An internal combustion engine comprising a cylinder, a valve, a seat for said valve, an exhaust chamber, and means for thermally insulating the walls of said exhaust chamber from said seat and for cooling said valve and seat.

7. Valve cooling means for gasoline motors having an exhaust chamber housing and a valve seat, comprising a radiating fin and a heat insulating gasket interposed between said seat and chamber housing, said radiating fin being in contact with said valve seat.

8. An internal combustion engine comprising a cylinder, a valve, a seat for said valve, an exhaust chamber housing, and means interposed between said seat and housing for thermally insulating said housing from said seat.

9. Cooling means, for internal combustion engines, comprising the combination of means for thermally insulating the exhaust chamber housing from the cylinder and heat radiating means interposed between the cylinder and the chamber housing.

10. An internal combustion engine comprising a cylinder having heat radiating means, an exhaust valve cage, and means for insulating said exhaust cage from said cylinder.

11. Means for preventing preignition in an internal combustion engine having cylinder cooling means, an exhaust valve cage, and an exhaust valve, comprising auxiliary cooling means adjacent the exhaust valve cage, and means for preventing heat in said exhaust valve cage from passing to the valve.

In witness whereof, I have hereunto subscribed my name.

WILLIAM S. HARLEY.

1,513,170

Certificate of Correction.

It is hereby certified that in Letters Patent No. 1,513,170, granted October 28, 1924, upon the application of William S. Harley, of Milwaukee, Wisconsin, for an improvement in "Cooling Means for Internal-Combustion Engines," an error appears in the printed specification requiring correction as follows: Page 2, line 60, claim 1, strike out the article " a " and insert instead the words *an exhaust;* and that the said Letters Patent should be read with this correction therein that the same may conform to the record of the case in the Patent Office.

Signed and sealed this 24th day of March, A. D. 1925.

[SEAL.]
KARL FENNING,
*Acting Commissioner of Patents.*